United States Patent
Johar et al.

(10) Patent No.: US 10,620,953 B2
(45) Date of Patent: Apr. 14, 2020

(54) INSTRUCTION PREFETCH HALTING UPON PREDECODING PREDETERMINED INSTRUCTION TYPES

(71) Applicant: ARM Limited, Cambridge (GB)

(72) Inventors: Kauser Yakub Johar, Cambridge (GB); Antony John Penton, Little Canfield (GB)

(73) Assignee: ARM Limited, Cambridge (GB)

( * ) Notice: Subject to any disclaimer, the term of this patent is extended or adjusted under 35 U.S.C. 154(b) by 230 days.

(21) Appl. No.: 15/432,121

(22) Filed: Feb. 14, 2017

(65) Prior Publication Data

US 2017/0286116 A1 Oct. 5, 2017

(30) Foreign Application Priority Data

Mar. 31, 2016 (GB) .................................. 1605434.8

(51) Int. Cl.
*G06F 9/38* (2018.01)
*G06F 9/30* (2018.01)
*G06F 9/32* (2018.01)

(52) U.S. Cl.
CPC ........ *G06F 9/3005* (2013.01); *G06F 9/30054* (2013.01); *G06F 9/324* (2013.01); *G06F 9/3804* (2013.01); *G06F 9/3806* (2013.01); *G06F 9/3867* (2013.01)

(58) Field of Classification Search
CPC ............. G06F 9/52; G06F 9/522; G06F 9/524
See application file for complete search history.

(56) References Cited

U.S. PATENT DOCUMENTS

| | | | | |
|---|---|---|---|---|
| 5,845,101 A | * | 12/1998 | Johnson | G06F 9/30152 712/207 |
| 7,085,916 B1 | | 8/2006 | Nguyen | |
| 2002/0042874 A1 | * | 4/2002 | Arora | G06F 9/30079 712/229 |
| 2006/0174090 A1 | * | 8/2006 | Sartorius | G06F 9/3804 712/207 |
| 2007/0226464 A1 | * | 9/2007 | Chaudhry | G06F 9/30145 712/209 |
| 2008/0177984 A1 | * | 7/2008 | Lataille | G06F 9/30043 712/220 |

(Continued)

FOREIGN PATENT DOCUMENTS

EP 1 460 532 9/2004
GB 2515076 12/2014

OTHER PUBLICATIONS

Combined Search and Examination Report for GB1605434.8 dated Sep. 8, 2016, 7 pages.

*Primary Examiner* — Jacob Petranek
(74) *Attorney, Agent, or Firm* — Nixon & Vanderhye P.C.

(57) ABSTRACT

A data processing apparatus has prefetch circuitry for prefetching instructions from a data store into an instruction queue. Branch prediction circuitry is provided for predicting outcomes of branch instructions and the prefetch circuitry may prefetch instructions subsequent to the branch based on the predicted outcome. Instruction identifying circuitry identifies whether a given instruction prefetched from the data store is a predetermined type of program flow altering instruction and if so then controls the prefetch circuitry to halt prefetching of subsequent instructions into the instruction queue.

11 Claims, 4 Drawing Sheets

(56) References Cited

U.S. PATENT DOCUMENTS

| | | | |
|---|---|---|---|
| 2009/0089562 A1* | 4/2009 | Schuchman | G06F 1/3203 |
| | | | 712/228 |
| 2010/0306515 A1* | 12/2010 | Al-Otoom | G06F 9/3848 |
| | | | 712/240 |
| 2011/0219376 A1* | 9/2011 | Williams | G06F 11/3466 |
| | | | 718/100 |
| 2012/0124345 A1 | 5/2012 | Denman et al. | |
| 2015/0058600 A1* | 2/2015 | Ishizaki | G06F 9/3804 |
| | | | 712/207 |
| 2017/0083339 A1* | 3/2017 | Burger | G06F 9/3004 |

* cited by examiner

INSTRUCTION PREFETCH HALTING UPON PREDECODING PREDETERMINED INSTRUCTION TYPES

This application claims priority to GB Patent Application No. 1605434.8 filed Mar. 31, 2016, the entire content of which is hereby incorporated by reference.

BACKGROUND

Technical Field

The present technique relates to the field of data processing.

Technical Background

A data processing apparatus may have prefetch circuitry for prefetching instructions from a data store into an instruction queue. Instructions from the queue are executed by processing circuitry. Prefetching can help improve performance by prefetching instructions into the queue before they are actually needed by the processing circuitry.

SUMMARY

At least some examples provide a data processing apparatus comprising:
prefetch circuitry to prefetch instructions from a data store into an instruction queue;
processing circuitry to perform data processing in response to instructions from the instruction queue;
branch prediction circuitry to predict an outcome or target of a branch instruction, wherein the prefetch circuitry is configured to prefetch instructions subsequent to the branch instruction selected in dependence on the predicted outcome or target of the branch instruction; and
instruction identifying circuitry to identify whether a given instruction prefetched from the data store is a predetermined type of program flow altering instruction for triggering a non-sequential change in program flow, and in response to identifying that the given instruction is said predetermined type of program flow altering instruction, to control the prefetch circuitry to halt prefetching of instructions subsequent to said predetermined type of program flow altering instruction into the instruction queue.

At least some examples provide a data processing apparatus comprising:
means for prefetching instructions from a data store into an instruction queue;
means for performing data processing in response to instructions from the instruction queue;
means for predicting an outcome or target of a branch instruction, wherein the means for prefetching is configured to prefetch instructions subsequent to the branch instruction selected in dependence on the predicted outcome of the branch instruction; and
means for identifying whether a given instruction prefetched from the data store is a predetermined type of program flow altering instruction, and in response to identifying that the given instruction is said predetermined type of program flow altering instruction, controlling the means for prefetching to halt prefetching of instructions subsequent to said predetermined type of program flow altering instruction into the instruction queue.

At least some examples provide a data processing method comprising:
prefetching instructions from a data store into an instruction queue; and
performing data processing in response to instructions from the instruction queue;
wherein the prefetching comprises:
prefetching instructions subsequent to a branch instruction selected in dependence on a predicted outcome or target of the branch instruction; and
identifying whether a given instruction prefetched from the data store is a predetermined type of program flow altering instruction, and in response to identifying that the given instruction is said predetermined type of program flow altering instruction, halting prefetching of instructions subsequent to said predetermined type of program flow altering instruction into the instruction queue.

Further aspects, features and advantages of the present technique will be apparent from the following description of examples, which is to be read in conjunction with the accompanying drawings.

DESCRIPTION OF EXAMPLES

Figure 1:
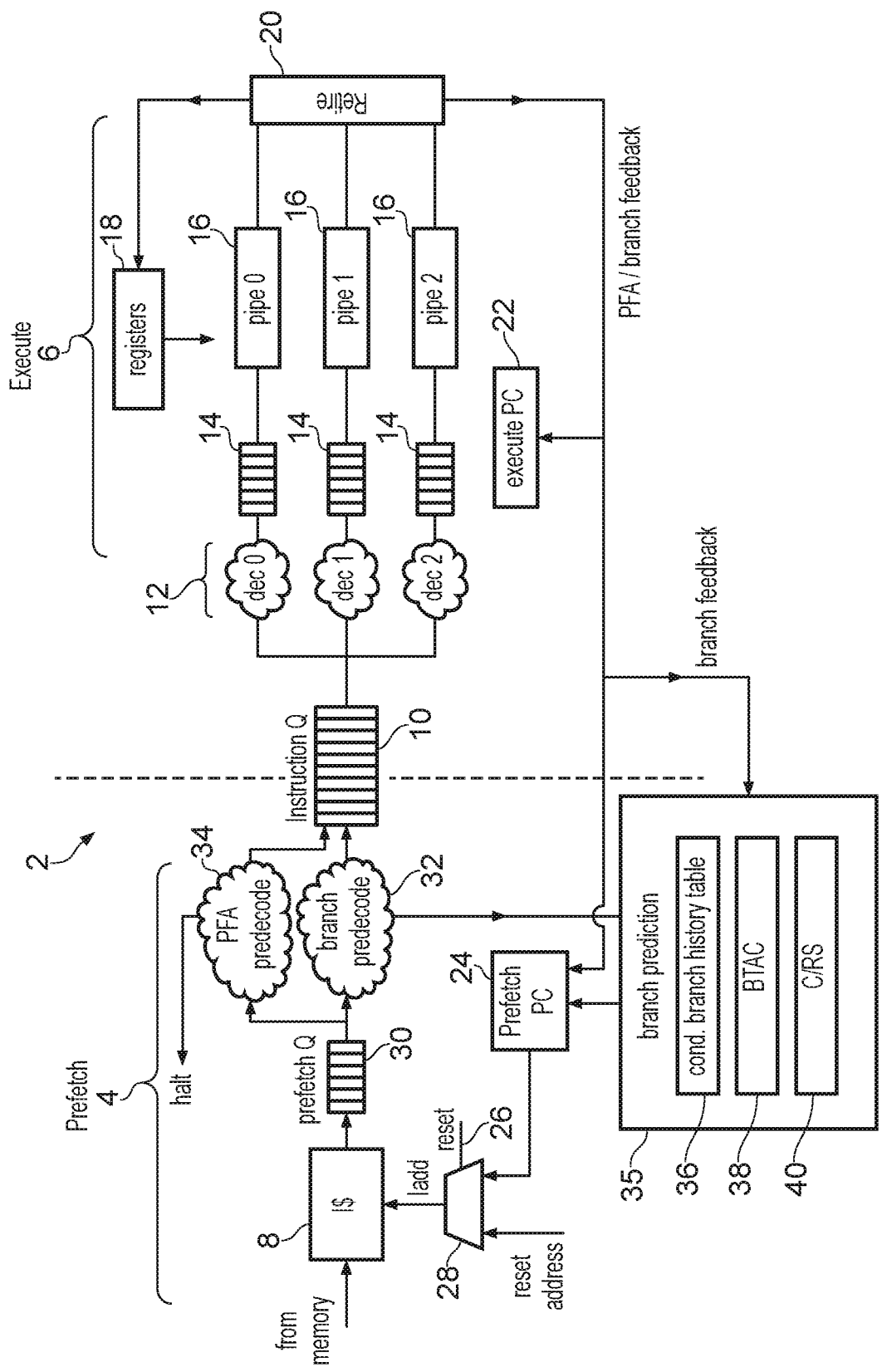
FIG. 1 schematically illustrates an example of a data processing apparatus comprising processing circuitry and prefetch circuitry.

Some specific examples will be discussed below. It will be appreciated that the invention is not limited to these particular examples.

Prefetch circuitry may be provided in a data processing apparatus to prefetch instructions from a data store (such as an instruction cache or memory) into an instruction queue. Processing circuitry executes the instructions from the instruction queue to perform data processing. The prefetch circuitry can prefetch instructions into the queue before the time when they are actually needed by the processing circuitry, to help improve performance. For example, if one instruction being executed encounters a long latency (for example while waiting for a data value to be returned from memory), in the meantime the prefetch circuitry can continue prefetching subsequent instructions into an instruction queue so that once the long latency instruction has completed, the next few instructions can be executed faster than if the system waited until the instructions were actually required before fetching them from the data store.

Branch prediction circuitry is provided to predict an outcome or target of a branch instruction, and the prefetch circuitry may then prefetch instructions subsequent to the branch instruction which are selected in dependence on the predicted outcome of the branch instruction. If the prediction is correct, then this allows performance to be improved since the subsequent instructions can be fetched into the queue before the actual outcome of the branch is resolved when the branch is executed by the processing circuitry.

However, there can also be other instructions which can trigger a non-sequential change in program flow, not just branches. One would expect that for improved performance, the outcome of other types of program flow altering instructions could also be predicted and subsequent instructions prefetched based on the predicted outcome. However, the inventors recognized that some types of program flow altering instruction can be relatively hard to predict, for example because their outcome may be strongly data dependent. Also, such program flow altering instructions are not commonly used by programmers/compilers (since branch instructions are more often used to control flow), so if the prefetch circuitry encounters such an instruction, it may not actually be an instruction which the programmer/compiler intended to be executed, but could for example be a literal data value which has been speculatively prefetched following misprediction of an earlier branch, where the literal data value happens by chance to have the same bit pattern as the program flow altering instruction. Continuing prefetching beyond such a program flow altering instruction could risk memory faults if regions of memory which have not been initialized in the address space are attempted to be accessed. This can lead to a proliferation of spurious fault conditions which would not actually occur when the prefetched instructions are executed as an earlier instruction may prevent the program flow reaching the program flow altering instruction anyway.

Hence, instruction identifying circuitry is provided for identifying whether a given instruction prefetched from the data store is a predetermined type of program flow altering instruction for triggering a non-sequential change in program flow. If such a predetermined type of program flow altering instruction is identified, then the prefetch circuitry is controlled to halt prefetching of subsequent instructions into the instruction queue. By stalling prefetching when one of the predetermined type of program flow altering instruction is identified, the likelihood of spurious errors being triggered by prefetched instructions can be reduced. It may seem counter-intuitive to prevent prefetching following the predetermined type of program flow altering instruction, since this would reduce performance if the program flow altering instruction turns out to be a real instruction and there is delay after it has been executed while the subsequent instructions are fetched from the data store. However, in practice, such program flow altering instructions are rarely used in real code by compilers, so this performance impact would not often be incurred, and can be outweighed by the benefit of avoiding spurious errors (which could trigger fault handling exceptions which themselves impact on performance).

After halting prefetching in response to the predetermined type of program flow altering instruction, the prefetch circuitry may resume prefetching of instructions subsequent to the predetermined type of program flow altering instruction into the instruction queue, in response to an indication of a resolved outcome of the predetermined type of program flow altering instruction received from the processing circuitry. Hence, if the program flow altering instruction does turn out to be a real instruction which actually ends up being executed by the processing circuitry, the prefetcher may resume prefetching. Prefetching could also resume if, after halting prefetching in response to the program flow altering instruction, an outcome of an earlier branch instruction is resolved by the processing circuitry and this triggers prefetching of subsequent instructions following the branch. Hence, similar mechanisms for resuming prefetching following a branch misprediction could be reused to resume prefetching following a program flow altering instruction.

Different types of branch prediction circuitry can be provided, such as a branch history table for predicting an outcome of the branch (whether or not the branch is taken), a branch target address cache for predicting a target of the branch (the address of the instruction to be executed following the branch), or a call/return data structure for tracking return addresses to be branched to by a function return branch instruction following execution of a function. The branch prediction circuitry may comprise any one or more of these types of branch predictor.

The predetermined type of program flow altering instruction may not be subject to branch prediction by the branch prediction circuitry. Since the program flow altering instruction may be relatively difficult to predict, suppressing branch predictions (and corresponding updates of the branch predictor information based on an outcome resolved by the processing circuitry) for such program flow altering instructions avoids polluting the branch predictor data, so that the branch instructions can be predicted more accurately.

The branch instructions which are subject to prediction by the branch prediction circuitry may have an opcode which identifies the instruction as a branch instruction. For example, an instruction having a certain value of opcode may always be treated as a branch instruction for changing program flow. Some branch instructions may be unconditional (so that they always redirect program flow). Other branch instructions may be conditional, so that whether they are taken or not depends on a test condition.

On the other hand, the predetermined type of program flow altering instruction may be at least one type of instruction for which whether the instruction is a program flow altering instruction depends on at least one parameter of the instruction other than the opcode. For example, such opcodes may be used for non-program-flow-altering instructions as well, but sometimes the other parameters of the instruction may allow program flow to be altered.

For example, an arithmetic instruction, logical instruction, load instruction or register move instruction may specify a destination register to be updated in response to the instruction. Most such instructions would not trigger a non-sequential change in program flow, if the destination register is a general purpose data register. However, if the instruction specifies a program counter register as a destination register, then the result of the instruction can be written to the program counter register, leading to a non-sequential change in program flow. Hence, the instruction identifying circuitry may for example identify whether a given instruction prefetched from the data store specifies a program counter register as its destination register, and if so halt the prefetching of subsequent instructions.

The technique discussed above can be particularly useful in systems which support a program-counter-relative load instruction which identifies an offset amount and triggers the processing circuitry to load into a destination register a data value having an address which is offset from the instruction address of the program-counter-relative load instruction by the specified offset amount. Such a program-counter-relative load instructions can be useful for accessing data values in a "literal pool", where data values are stored alongside the program instructions being executed in memory. Often, such a literal pool will be preceded by an instruction, such as a branch, which would redirect program flow before the instruction execution actually reaches the literal pool. However, if there is a branch misprediction, or the prefetch circuitry does not recognize the type of instruction which was intended to stop program flow reaching the literal pool, data from the literal pool could accidentally be prefetched as an instruction, and if the literal value by chance has a bit pattern corresponding to the predetermined type of program flow altering instruction, then prefetching beyond this program flow altering instruction could lead to accesses to uninitialized memory, causing spurious faults as discussed above. By halting prefetching when the predetermined type of program flow altering instruction is encountered (which is often more likely to be the result of fetching a literal value rather than a real instruction provided by the programmer/ compiler), such spurious faults can be avoided. If it turns out that this was a real instruction, then when the processing circuitry reaches the instruction it can determine its actual outcome and this can trigger prefetching to resume from the appropriate point of the program.

In addition to the predetermined type of program flow altering instruction, the instruction identifying circuitry may also control the prefetch circuitry to halt prefetching in response to one or more other types of instruction. For example, any of the following types of instructions may be identified and trigger prefetching to be halted:

A privilege-level changing instruction for redirecting program flow to a process having a different privilege level to a current process. For example, this type of instruction may include an instruction for calling supervisor or hypervisor code, or returning program flow to an application level process following the supervisor or hypervisor being executed.

A wait-for-exception instruction for triggering the processing circuitry to pause processing until an exception event is detected. For example such an instruction may be used at the end of a program routine to instruct the processor that it can enter a sleep mode until an exception event is detected indicating another event that needs a response. Exception events may include software-generated exceptions (e.g. caused by memory faults or an attempt to execute an undefined instruction) and hardware interrupts triggered by a hardware signal or external event, such as the user pressing a button on the device.

These types of instructions may sometimes also be used at the end of a processing routine, prior to a literal pool, to ensure that program flow does not reach the literal pool. By identifying such instructions and halting prefetching when they are encountered, this can reduce the risk of errors being caused by speculative prefetching of the literal pool.

Another type of instruction for which prefetching can be halted is a context synchronization instruction for triggering a flush of pending instructions subsequent to the context synchronization instruction from the processing circuitry and the prefetch circuitry. For example, when program code in an instruction cache is updated, old versions of the program code could still be resident in the pipeline, so to prevent them from being executed, the context synchronization instruction can be executed to flush any subsequent instructions, and force them to be refetched from the instruction cache. As the prefetching circuitry may prefetch instructions ahead of time, sometimes by the time the processing circuitry actually executes the context synchronization instruction to trigger the flush of the subsequent instructions, the prefetching circuitry may already have updated some state in response to speculatively prefetched instructions beyond the context synchronization instruction. This can sometimes lead to incorrect results for the refetched instructions which are fetched back into the pipeline following the context synchronization. By halting prefetching when the context synchronization instruction is encountered, such corruption of state can be avoided.

For example, one type of processor state which could be corrupted if prefetching continued beyond the context synchronization instruction may be a call/return data structure for tracking return addresses for function calls. In response to a function call branch instruction specifying a target address, the prefetch circuitry may store a return address to the call/return data structure and prefetch a subsequent instruction identified by the target address into the instruction queue. In response to a function return branch instruction, the prefetch circuitry may prefetch into the instruction queue a subsequent instruction identified by the return address read from the call/return data structure. However, it is relatively common for a program to include several function calls in quick succession. If one of the called functions includes the context synchronization instruction, then by the time the context synchronization instruction is actually executed by the processing circuitry, the prefetch circuitry may already have encountered the return branch instruction of that function and the function call branch instruction of a second function, so the prefetch circuitry may already have updated the call/return data structure to store the return address for the second function. If the context synchronization instruction then triggers a flush and instructions from the first function are later refetched, the call/return data structure may be incorrect since it may lead to the first function return using the return address of the second function call, not the first. This can be avoided by halting prefetching in response to a context synchronization instruction, so that there will be no speculative updating of prefetch state by the prefetch circuitry beyond the context synchronization instruction.

FIG. 1 schematically illustrates an example of a data processing apparatus 2 having a prefetch unit (prefetch circuitry) 4 and an execute unit (processing circuitry) 6. The prefetch unit 4 prefetches the instructions from an instruction cache 8 into an instruction queue 10 in which the instructions are queued to await processing by the execute unit 6. Instructions from the instruction queue 10 are decoded by one or more instruction decoders 12 in the execute unit 6, and the decoded instructions are queued in an issue queue 14 and then executed by execution pipelines 16. The execute unit 6 has multiple execution pipelines 16 for executing different types of instructions, for example, an ALU pipeline for executing arithmetic or logical instructions, a load/store pipeline for executing load/store instructions and a floating-point pipeline for executing floating-point instructions. Each of the execution pipelines 16 reads operands from registers 18 and generates processing results which are written back to the registers at a retire stage 20. It will be appreciated that this is just one example of a possible pipeline architecture, and the execute unit 6 may have other features not illustrated in FIG. 1 for conciseness.

The execute unit 6 has a program counter register 22 storing a program counter indicating the address of an instruction representing the current point of execution reached by the execute stage 6. The program counter register 22 may be incremented sequentially in response to most instructions, but a branch instruction or other program flow altering instruction the retire stage 20 may update the program counter 22 to a value which does not follow sequentially from that instruction's address, i.e. a non-sequential change of control flow. If, following a branch or program flow altering instruction, the instruction having the updated program counter 22 address is not in the issue queue 14 then a misprediction mechanism is triggered to signal to the prefetch stage 4 to prefetch the required instruction.

In general, most instructions may be processed by the execute unit 6 faster than the latency associated with fetching them from the instruction cache 8. However, there may be some instructions which incur a relatively long latency, for example load instructions to load data value from memory. If the fetching of the next instruction had to wait until the previous instruction has been executed 6, then this would affect performance. The provision of the prefetch circuitry 4 and the instruction queue 10 enables fetching of the instructions from the instruction cache 8 to be decoupled from the timing at which the fetch instructions are executed, so that performance can be improved since the prefetch unit 4 can prefetch the next instruction into the instruction queue 10 when there is space in the instruction queue, regardless of whether the execute unit 6 has executed all preceding instructions. When a relatively long latency instruction is encountered, then while the execute stage 6 is waiting for it to be completed, the prefetch unit 4 can use this time to prefetch further subsequent instructions into the instruction queue 10 so that once the long latency instruction has completed then the subsequent instructions can be handled faster. Since the prefetch unit 4 may have prefetched instructions beyond the current point of execution indicated by the execute program counter register 22, the prefetch unit 4 has a prefetch program counter 24 which stores an indication of the address of the instruction representing the point of execution that has been reached by the prefetch unit 4 (e.g. the address of the most recently prefetched instruction).

For most instructions which do not trigger a non-sequential change of program flow, the prefetch unit 4 may simply prefetch them directly from the instruction cache 8 into the instruction queue 10 and update the prefetch program counter 24 to point to the next instruction. The next instruction is prefetched each time space becomes available in the instruction queue 10. If a reset signal 26 is asserted to reset the processor to an initial state, then the prefetch unit 4 may restart prefetching from a default reset address. Hence, a multiplexer 28 may be provided to select between the reset address and the prefetch program counter address 24 depending on whether the reset signal 26 has been enabled.

However, certain instructions may trigger a non-sequential change of program flow. These may include branch instructions as well as some non-branch instructions. Following such a branch instruction or a program flow altering instruction there may be different outcomes as to which instructions are to be executed following the branch or program flow altering instruction, and so the prefetch circuitry 4 may have logic for determining which instruction should be prefetched subsequent to that instruction. Hence, the instructions fetched from the instruction cache 8 may be temporarily stored in a prefetch queue 30 and the instructions in the prefetch queue may be partially decoded by branch predecoding circuitry 32 and program flow altering instruction predecoder (instruction identifying circuitry) 34 to identify whether a prefetched instruction is a branch or other type of program flow altering instruction.

The branch predecoding circuitry 32 examines the opcode of a given instruction in the prefetch queue 30, and determines whether the opcode has a value indicating that instruction is branch instruction. If the instruction is a branch then the branch predecoder 32 initiates a branch prediction using branch prediction circuitry 35. The branch prediction circuitry 35 includes various mechanisms for predicting outcomes or target addresses of branch instructions, including a branch history table 36 for predicting the outcomes of conditional branch instructions, a branch target address cache (BTAC) 38 for predicting target addresses of branch instructions, and a call/return stack (C/RS) 40 for tracking return addresses of function calls. Any known branch prediction mechanisms can be used for predicting the outcomes of branches. Based on the branch prediction circuitry 35, it is determined whether the branch will be taken or not taken.

If the branch is predicted not taken, prefetching continues sequentially beyond the branch. If the branch is predicted taken, prefetching continues from the instruction having the predicted target address. The branch itself meanwhile is passed to the instruction queue 10 so that it is ready for execution by the execute unit 6. When the branch instruction reaches one of the execute pipelines 16, the actual branch outcome or target is determined (for example, this may depend on contents of the registers 18 for a conditional branch or an indirect branch), and the retire stage 20 passes a feedback indication to the branch prediction circuitry 35 to update the branch prediction information in the structures 36, 38, 40 depending on the branch outcome. If the branch was predicted correctly, then the branch prediction information can be updated to reinforce that prediction to make it more likely that the prediction will be made again when the same instruction address is encountered. If there is a misprediction, then the branch prediction information may be updated to reflect the actual outcome and in this case the processing pipeline may need to be flushed of the instructions which were prefetched assuming a different branch outcome. Based on the branch feedback indication the prefetch program counter 24 can be updated to the actual branch target address and prefetching may then resume from the correct point of execution.

The instruction identifying circuitry 34 has partial decoding capability for identifying certain types of instructions. The instruction identifying circuitry does not contain the full decoding resources of the decode stage 12 and the execute unit 6 so cannot identify every type of instruction. The instruction identifying circuitry 34 simply checks for one or more types of instruction for which prefetching should be halted following that instruction. If the given instruction taken from the prefetch queue 30 is not a branch as identified by the branch predecoder 32, and not one of the types of instructions checked by the instruction identifying circuitry 34, then it is simply placed in the instruction queue and prefetching continues sequentially beyond that instruction.

The instruction identifying circuitry 34 determines whether a prefetched instruction is a predetermined type of program flow altering instruction. For example, the prefetched instruction is considered to be the predetermined type of program flow altering instruction if it is an arithmetic, logical, load or register move instruction specifying the program counter register 22 as its destination register. If the predetermined type of program flow altering instruction is identified, then the instruction identifying circuitry 34 controls the prefetch unit 4 to halt prefetching of subsequent instructions. The program flow altering instruction itself is still passed to the instruction queue 10, but prefetching of subsequent instructions is paused until a feedback indication from the retire stage 20 restarts prefetching following a resolved branch or program flow altering instruction. Eventually, if the program flow altering instruction ends up being executed by the execute unit 6, then its actual outcome can be determined and this can trigger prefetching to resume with the next instruction following the program flow altering instruction. Hence, the execute stage may effectively treat the program flow altering instruction as a mis-predicted branch forcing reinitiation of fetching to the target address.

Some examples of the predetermined type of program flow altering instruction checked by the instruction identifying circuitry may include the following (this is not an exhaustive list):

ADD {pc}, Rn, Rm—an add instruction which writes the sum of two input operands to the program counter register;

MOV {pc}, Rm—a register move instruction which moves an input operand from a source register to the program counter register.

These types of instructions are not often used for redirecting program flow by most compilers, but sometimes are used by a programmer writing assembly code from scratch. Nevertheless they are relatively uncommon. Attempting to predict the outcomes of these types of program flow altering instructions can be difficult since often their outcome is data dependent (e.g. the outcome of the ADD instruction above depends on the contents of both registers Rm, Rn). Hence, using the branch predictor 35 for such instructions may pollute the contents of the branch history table 36 or BTAC 38 for example. Not using the branch predictor for such instructions can help to improve accuracy of branch instructions for conventional branch instructions.

Also, continuing prefetching beyond such program flow altering instruction can cause some problems. For example, the following code sequence shows a scenario where faults can arise if prefetching continues beyond the program flow altering instruction:

```
LDR r0, [pc, #12]    // program-counter-relative load which loads register r0 with
                     data value from literal pool
NOP
SVC                  // return to OS
dpool: DCD 3925930239 // Decodod as a direct branch D 0xFF
```

In the above example, when the sequence is actually executed, the execute unit will encounter the SVC instruction which will return control flow to an operating system (e.g. by triggering exception), so program execution may never reach the literal pool (dpool). However, the prefetch unit 4 may not have full decoding capability so may not recognize the SVC instruction. If the prefetch engine continued to prefetch beyond the SVC instruction, it could fetch a data value from the literal pool, which may by chance happen to have the same bit pattern a program flow altering instruction or branch. If this is decoded as a branch, this could lead to a branch to an arbitrary memory location not intended by the programmer, which could be in an uninitialized region of the memory address space. If the prefetcher then attempts to fetch in sequential instructions following that address, this could rapidly lead to a proliferation of memory faults caused by accesses to uninitialized memory, and these spurious faults (which are not caused by real instructions) may overwhelm the fault handling capability of the processor. This can be particularly problematic for systems designed for relatively safety-critical applications (such as automotive), where one requirement may be to react to faults detected in a limited period of time and there may be a need to prevent the accumulation of latent faults.

This problem can be avoided because the instruction identifying circuitry 34 halts prefetching when a predetermined type of program flow altering instruction is encountered. Since such program flow altering instructions are rare in real code, it is relatively likely that if the prefetcher encounters such an instruction, this may be due to fetching of a literal data value, so halting prefetching can prevent subsequent spurious faults caused by further prefetching.

Figure 2:
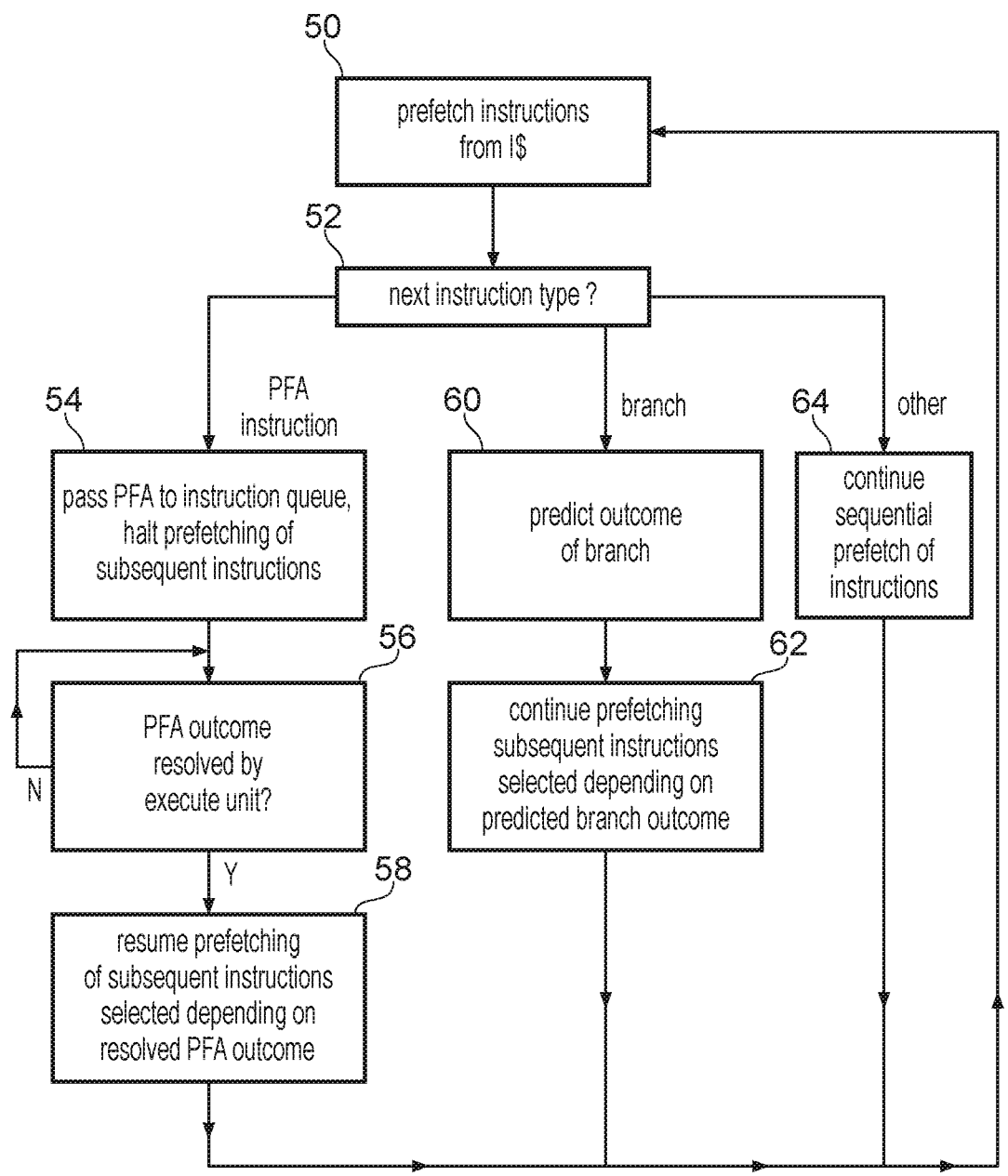
FIG. 2 is a flow diagram illustrating a method of prefetching instructions.

FIG. 2 is a flow diagram illustrating a method of handling prefetching. At step 50 instructions are prefetched from the instruction cache 8 and placed in the prefetch queue 30. At step 52 the branch predecoder 32 and instruction identifying circuitry 34 each identify the type of the next instruction in the prefetch queue 30. If the instruction is a predetermined type of program flow altering instruction (e.g. an instruction specifying the program counter register 22 as its destination register), then at step 54 prefetching of subsequent instructions is halted. The program flow altering instruction is passed to the instruction queue 10. At step 56 the prefetch unit 4 determines whether an outcome of the program flow altering instruction has been resolved by the execute unit. If not, then the prefetch unit 4 continues to wait. Once the outcome of the program flow altering instruction has been resolved, then at step 58 the prefetch unit 4 resumes prefetching of subsequent instructions which are selected depending on the resolved outcome of the program flow altering instruction. The method then returns to step 50 to continue prefetching. Although not shown in FIG. 2, sometimes, while waiting at step 56, another event may occur which also causes prefetching to resume (e.g. a reset when the reset signal 26 is asserted, or a misprediction of an earlier branch instruction), and in this case the method may also return to step 50 to resume prefetching of subsequent instructions.

On the other hand, if the branch predecoder 32 identifies that the next instruction taken from the prefetch queue 30 is a branch instruction, then at step 60 the branch predecoder 32 initiates a branch prediction and the branch prediction circuitry 35 predicts the outcome or target of the branch. For example, the branch history table 36 or BTAC 38 can be looked up based on the instruction address, to identify the predicted branch outcome (taken or not taken) and the predicted target address. If the branch is a function calling branch instruction which specifies a target address, then the predicted target address is simply the target address specified by the functional call branch instruction, but also the prefetch unit 4 writes the address of the next instruction after the function calling branch to the call/return stack 40, as a return address to which processing is to be directed following completion of the function. On the other hand, if the branch is a function return instruction which redirects processing to previous processing following completion of the function, then the target address of the branch is predicted by reading the return address from the call/return stack 40. At step 62, the prefetch unit 4 continues prefetching of subsequent instructions following the branch, with the subsequent instructions being selected depending on the predicted branch outcome and target address.

On the other hand, if the next instruction prefetched is another type of instruction (not a branch or program flow altering instruction) then at step 64 the prefetch unit 4 continues sequential prefetch of subsequent instructions.

As well as the predetermined type of program flow altering instruction, the instruction identifying circuitry 34 can optionally also identify other types of instruction which are to halt prefetch.

For example, there may be some privilege-level changing instructions which trigger a transition to program code associated with a different privilege-level to the currently executing code. For example, instructions may be provided for passing control to a higher privilege code such as an operating system, hypervisor or security monitor code. Also, instructions may be provided for returning processing to less privileged code following execution of an operating system, hypervisor or security monitor. These instructions may for example trigger an exception event which causes an exception handler to manage the transfer of program flow to the process having the different privilege level. As such instructions may often be the last instruction in a given program routine (and may precede a literal pool), checking for such instructions and halting prefetching when they are encountered can reduce the likelihood that literal pool data values are accidentally prefetched and interpreted as instructions. Once the privilege-level changing instruction has been executed by the processing unit 6, prefetching may then be resumed, e.g. triggered by feedback from the execute unit 6 when a required instruction is not present in the issue queue 14.

Another type of instruction for which it can be useful to halt prefetching is a "Wait For Exception" (WFE) instruction which triggers the processing circuitry to pause processing until an exception event occurs. Such WFE instructions may also include "Wait for Interrupt" (WFI) instructions which instruct the processor to wait for an interrupt event, which is a particular type of exception event. Again, the WFE or WFI instructions are often used at the end of a program routine, and so halting prefetching on encountering such an instruction can reduce the likelihood that literal pool values are inappropriately fetched as instructions, which could lead to spurious memory faults.

Another type of instruction which can be identified by the instruction identifying circuitry 34 is a context synchronization instruction (also known as an instruction synchronization barrier instruction, or ISB instruction), which triggers a pipeline flush of both the prefetch circuitry 4 and the execute circuitry 6. When an ISB instruction is executed by the execute unit 6, then all instructions subsequent to that ISB instruction in the program order which are resident in the pipeline are flushed. As the next instruction indicated by the execute program counter 22 will then not be present in the issue queue 14, this will trigger the feedback mechanism which causes the prefetch unit 4 to resume prefetching from the instruction address subsequent to the ISB instruction. Hence, this forces a refetch of the instructions subsequent to the ISB instruction from the instruction cache. Triggering a flush with an ISB instruction can be useful when program code in the instruction cache 8 has been updated and it is desired to prevent the execute unit 6 executing old versions of program instructions at the same addresses which may still be pending in the pipeline.

The example code sequence shown below illustrates a situation in which continuing prefetching beyond the ISB instruction could corrupt the call/return stack 40 and cause mis-predictions:

| a | BL b | //function calling branch instruction for calling function b below |
|---|---|---|
| a + 4 | BL c | //second function calling branch instruction for function c |
| b | NOP | |
| | NOP | |
| | ISB | //context synchronisation instruction |
| | BX lr | //function return branch, for returning processing to the address a + 4 following the address a of the function calling branch for function b |

Figure 4:
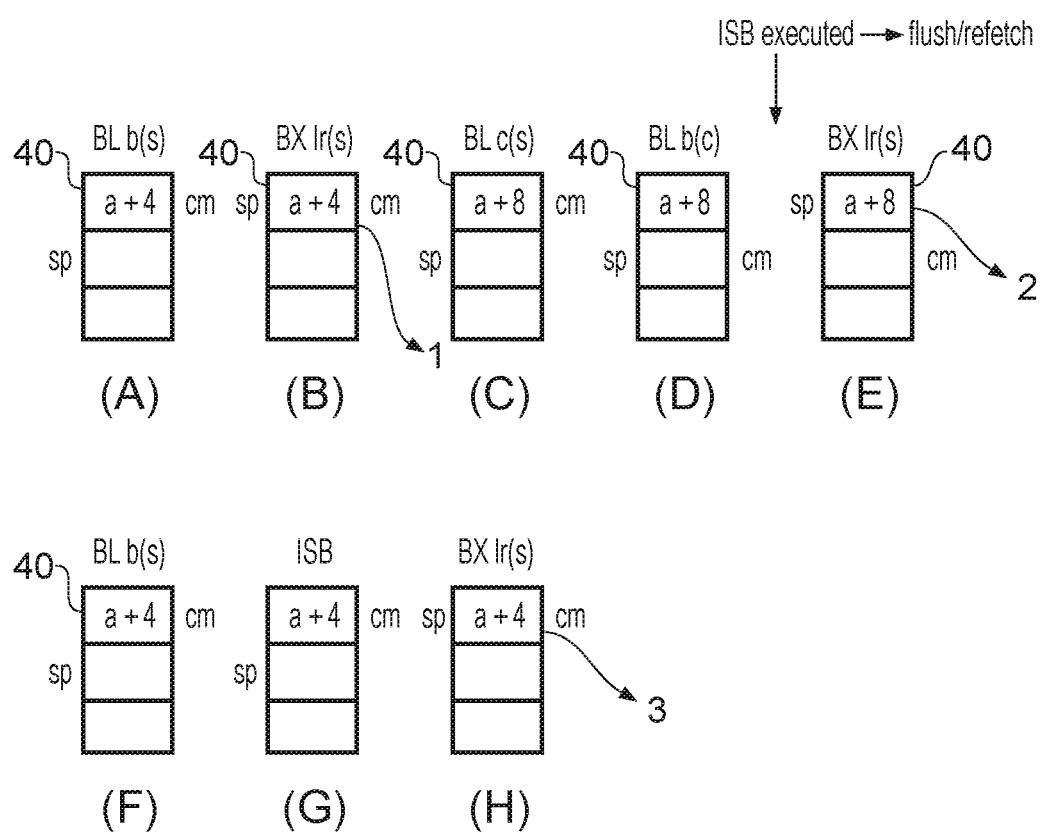
FIG. 4 shows an example of halting prefetching in response to a context synchronization instruction to prevent corruption of a call/return data structure.

For comparison, the top part of FIG. 4 shows a problem which can arise from updating the call/return stack 40 if prefetching continues beyond the ISB instruction. As shown in part A of FIG. 4, when the first function calling instruction (BL b) of the sequence shown above is executed, then the return address a+4 of the next instruction is pushed to the call/return stack 40. The prefetch unit then continues to prefetch instructions from function b, including the ISB instruction, and eventually reaches the function return branch (BX lr) which causes the return address a+4 to be popped from the stack as shown in part B of FIG. 4. Hence, the prefetch program counter 24 becomes equal to a+4, so the next instruction prefetched is the second function call branch instruction (BL c). As shown in part C of FIG. 4, prefetching of this instruction causes the prefetch unit 4 to push the address of the following instruction (i.e. address a+8) to the call/return stack 40 as the return address. The second return address a+8 replaces the previous return address a+4 since address a+4 was popped from the stack when the return branch BX lr was encountered.

However, meanwhile, the execute unit 6 may still be executing the instructions from the previous function b. As shown in part D of FIG. 4, by the time the execute unit executes the first function call branch BL b the call/return stack may already have been speculatively updated by the prefetch unit 4 to indicate the return address for the next function call instruction BL c. Normally, this would not be a problem—the prefetch unit 4 is simply prefetching in instructions a little ahead of the point of execution reached by the execute unit 6.

However, when the ISB instruction is executed within function b, this triggers a flush of subsequent instructions from the entire pipeline (including the prefetch unit 4 and execute unit 6). At part E of FIG. 4, prefetching restarts from the first instruction after the ISB instruction—the branch return instruction BX lr. However, as shown in part E, since the return address a+8 on the call/return stack 40 is actually the return address for returning from the later function c, not the return address for the current function return b (which should be a+4), the prefetch unit 4 will then prefetch instructions from the wrong address, and function c may end up not being executed at all.

As shown in the lower part of FIG. 4, this problem can be avoided because the instruction identifying circuitry 34 identifies ISB instructions, and when an ISB instruction is detected, halts prefetching. Part F of FIG. 4 is the same as part A, and sets the return address a+4 on the call/return stack in response to the first function call instruction BL b. However, this time when the ISB instruction is encountered, prefetching is halted as shown in part G of FIG. 4, and so prefetching never reaches the function return branch BX lr. Once the ISB instruction is executed, and the pipeline has been flushed, prefetching is restarted from the instruction following the ISB instruction, and as shown in part H of FIG. 4, when the function return branch BX lr is prefetched, the call/return stack 40 still stores the correct return address a+4, so that the next instruction prefetched will be the next function call instruction BL c, giving the correct outcome. Hence, halting prefetching when an ISB content synchronization instruction is encountered can prevent corruption of the call/return stack.

Figure 3:
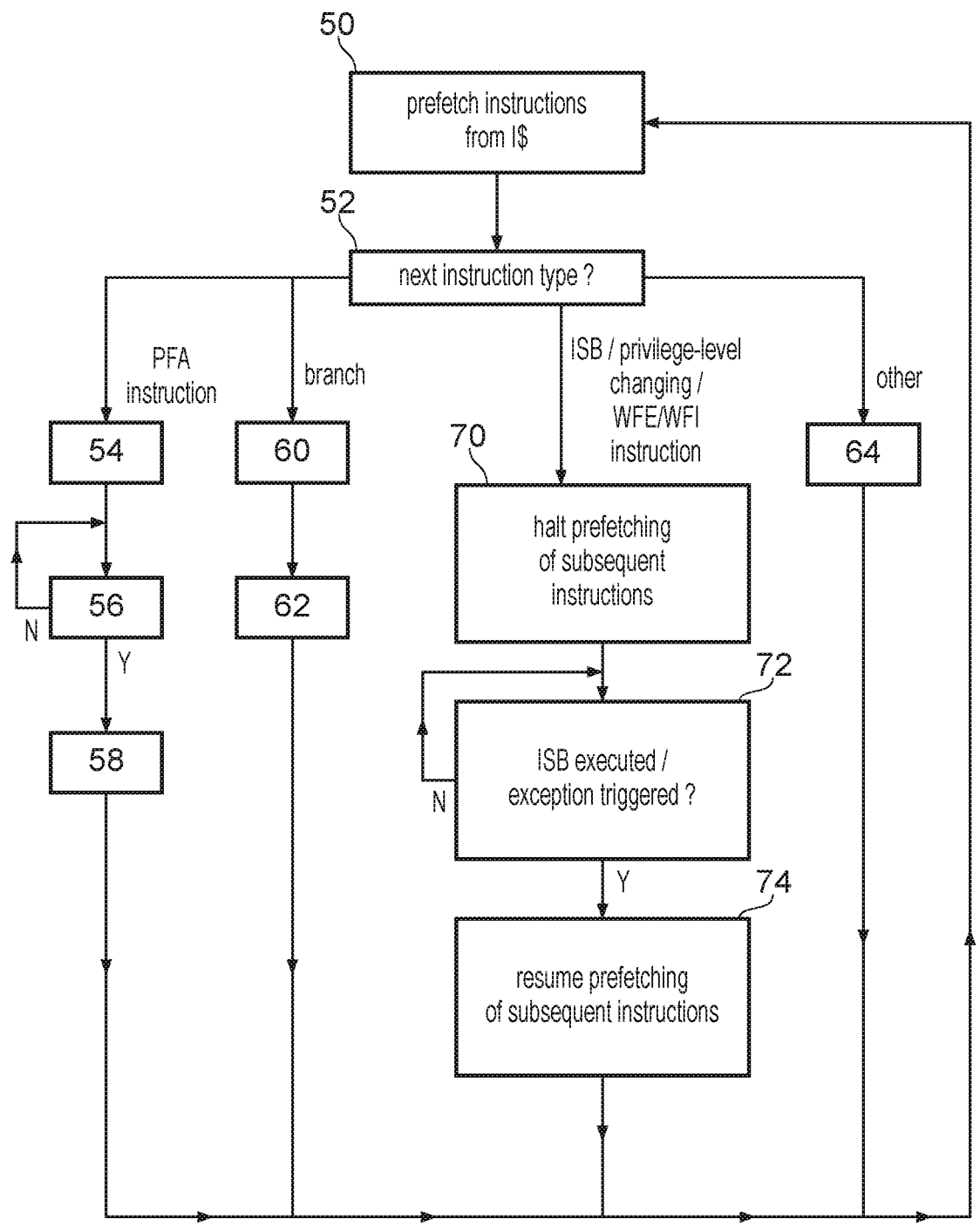
FIG. 3 is a flow diagram showing another example of prefetching instructions.

FIG. 3 is a flow diagram illustrating a method of controlling prefetching in which, in addition to the program flow altering (PFA) instruction, other types of instructions also trigger halting of prefetching. Steps 50, 52, 54, 56, 58, 60, 62 and 64 are the same as in FIG. 2. However, in FIG. 3 when the next instruction from the prefetch queue 30 is identified to be either an ISB instruction, a privilege-level changing instruction or a WFE/WFI instruction, then at step 70 prefetching of subsequent instructions is halted. At step 72, the prefetcher 4 waits for the ISB instruction to be executed, or for an exception to be triggered by the privilege-level changing instruction or following execution of the WFE or WFI instruction. Following execution of the ISB instruction or an exception triggered by the privilege-level changing instruction or WFE/WFI instruction, prefetching resumes at step 74.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes and modifications can be effected therein by one skilled in the art without departing from the scope of the appended claims.

We claim:

1. A data processing apparatus comprising:
    prefetch circuitry to prefetch instructions from a data store into an instruction queue;
    processing circuitry to perform data processing in response to instructions from the instruction queue;
    branch prediction circuitry to predict an outcome or target of a branch instruction, wherein the prefetch circuitry is configured to prefetch instructions subsequent to the branch instruction selected in dependence on the predicted outcome or target of the branch instruction; and
    instruction identifying circuitry to identify whether a given instruction prefetched from the data store is a predetermined type of program flow altering instruction comprising an arithmetic instruction, logical instruction, load instruction or register move instruction specifying a program counter register as a destination register, and in response to identifying that the given instruction is said predetermined type of program flow altering instruction, to control the prefetch circuitry to halt prefetching of instructions subsequent to said predetermined type of program flow altering instruction into the instruction queue;
    wherein the predetermined type of program flow altering instruction comprises a non-branch instruction for which branch prediction by the branch prediction circuitry is omitted.

2. The data processing apparatus according to claim 1, wherein the prefetch circuitry is configured to resume prefetching of instructions subsequent to said predetermined type of program flow altering instruction into the instruction queue in response to an indication of a resolved outcome or target of the predetermined type of program flow altering instruction received from the processing circuitry.

3. The data processing apparatus according to claim 1, wherein the branch instruction comprises an opcode identifying that the instruction is a branch instruction.

4. The data processing apparatus according to claim 1, wherein the predetermined type of program flow altering instruction comprises at least one type of instruction for which the instruction identifying circuitry is configured to identify whether the instruction is a program flow altering instruction in dependence on at least one parameter of the instruction other than an opcode.

5. The data processing apparatus according to claim 1, wherein in response to a program-counter-relative load instruction identifying an offset amount, the processing circuitry is configured to load into a destination register a data value having an address offset from an instruction address of the program-counter-relative load instruction by the offset amount.

6. The data processing apparatus according to claim 1, wherein the instruction identifying circuitry is configured to identify whether the given instruction is a privilege-level changing instruction for redirecting program flow to a process having a different privilege level to a current process, and in response to identifying that the given instruction is said privilege-level changing instruction, to control the prefetch circuitry to halt prefetching of instructions subsequent to said privilege-level changing instruction into the instruction queue.

7. The data processing apparatus according to claim 1, wherein the instruction identifying circuitry is configured to identify whether the given instruction is a wait-for-exception instruction for triggering the processing circuitry to pause processing until an exception event is detected, and in response to identifying that the given instruction is said wait-for-exception instruction, to control the prefetch circuitry to halt prefetching of instructions subsequent to said wait-for-exception instruction into the instruction queue.

8. The data processing apparatus according to claim 1, wherein the instruction identifying circuitry is configured to identify whether the given instruction is a context synchronization instruction for triggering a flush of pending instructions subsequent to the context synchronization instruction from the processing circuitry and the prefetch circuitry, and in response to identifying that the given instruction is said context synchronization instruction, to control the prefetch circuitry to halt prefetching of instructions subsequent to said context synchronization instruction into the instruction queue.

9. The data processing apparatus according to claim 8, wherein in response to a function call branch instruction specifying a target address, the prefetch circuitry is configured to store a return address to a call/return data structure, and the prefetch circuitry is configured to prefetch a subsequent instruction identified by the target address into the instruction queue; and
    in response to a function return branch instruction, the prefetch circuitry is configured to prefetch into the instruction queue a subsequent instruction identified by the return address read from the call/return data structure.

10. A data processing apparatus comprising:
    means for prefetching instructions from a data store into an instruction queue;
    means for performing data processing in response to instructions from the instruction queue;
    means for predicting an outcome or target of a branch instruction, wherein the means for prefetching is configured to prefetch instructions subsequent to the branch instruction selected in dependence on the predicted outcome of the branch instruction; and means for identifying whether a given instruction prefetched from the data store is a predetermined type of program flow altering instruction comprising an arithmetic instruction, logical instruction, load instruction or register move instruction specifying a program counter register as a destination register, and in response to identifying that the given instruction is said predetermined type of program flow altering instruction, controlling the means for prefetching to halt prefetching of instructions subsequent to said predetermined type of program flow altering instruction into the instruction queue;

wherein the predetermined type of program flow altering instruction comprises a non-branch instruction for which branch prediction by the branch prediction circuitry is omitted.

11. A data processing method comprising:

prefetching instructions from a data store into an instruction queue; and performing data processing in response to instructions from the instruction queue;

wherein the prefetching comprises:

prefetching instructions subsequent to a branch instruction selected in dependence on a predicted outcome or target of the branch instruction; and identifying whether a given instruction prefetched from the data store is a predetermined type of program flow altering instruction comprising an arithmetic instruction, logical instruction, load instruction or register move instruction specifying a program counter register as a destination register, and in response to identifying that the given instruction is said predetermined type of program flow altering instruction, halting prefetching of instructions subsequent to said predetermined type of program flow altering instruction into the instruction queue;

wherein the predetermined type of program flow altering instruction comprises a non-branch instruction for which branch prediction by the branch prediction circuitry is omitted.

* * * * *